D. F. HULL.
Seeder and Fertilizer Distributer.

No. 213,509. Patented Mar. 25, 1879.

Attest.
Jeremiah F. Twohig.
John Wright.

Inventor.
Davit F. Hull
By his atty.

UNITED STATES PATENT OFFICE.

DAVIT F. HULL, OF HAGERSTOWN, MARYLAND, ASSIGNOR TO THE HAGERSTOWN AGRICULTURAL IMPLEMENT MANUFACTURING COMPANY, OF SAME PLACE.

IMPROVEMENT IN SEEDER AND FERTILIZER-DISTRIBUTER.

Specification forming part of Letters Patent No. 213,509, dated March 25, 1879; application filed April 10, 1878.

*To all whom it may concern:*

Be it known that I, DAVIT F. HULL, of Hagerstown, county of Washington, and State of Maryland, have invented Improvements in Seeder and Fertilizer, of which the following is a specification:

This invention has relation to the class of seeders and fertilizers having a roller-feed, in which the grain passes from the hopper between two rollers, (one of metal, and the other of india-rubber or some other elastic material, or both of rubber,) and the fertilizing substance is dropped from a different hopper into the same spouts that conduct the grain to the ground.

The improvements consist, first, in substituting for the solid metal roller, or for a hollow cast-metal roller, a hollow-shell roller made of wrought metal, constructed as hereinafter described; second, on the shaft upon which the india-rubber roller turns, disks with one or more projections upon their face, which fit into corresponding depressions cast or molded in the ends of the rubber rollers, which, being pressed against the ends of the roller and fastened, hold the roller firmly in place; third, the spout-board and one or more standards, sustaining the lower hoppers or conducting-funnels, and the spouts which conduct the grain and fertilizing substance to the ground; fourth, the flanged rings by which the flanged rubber spouts that conduct the grain and fertilizing material to the ground are attached to the spout-board, and so arranged as to be turned round, so as to wear evenly.

Figure 1:
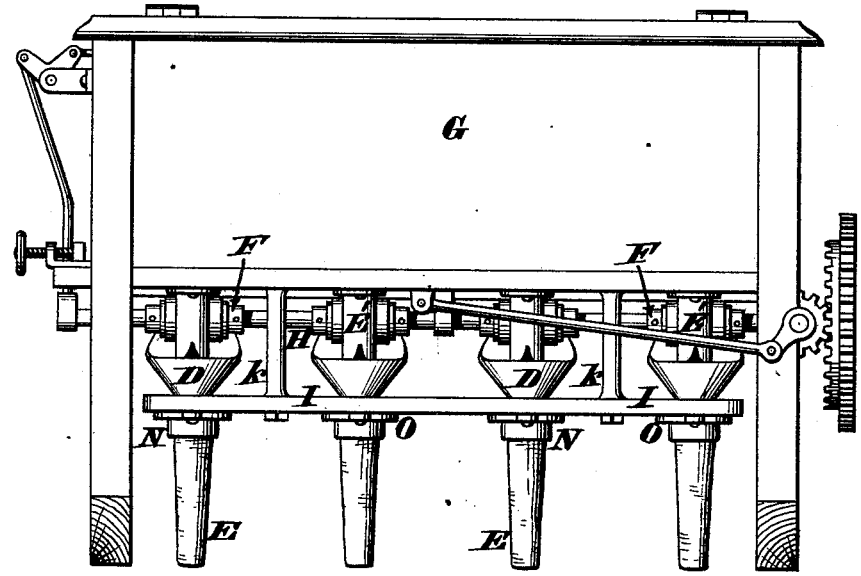
Figure 2:
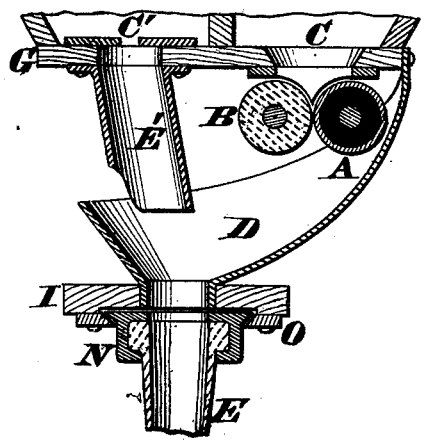
Figure 3:
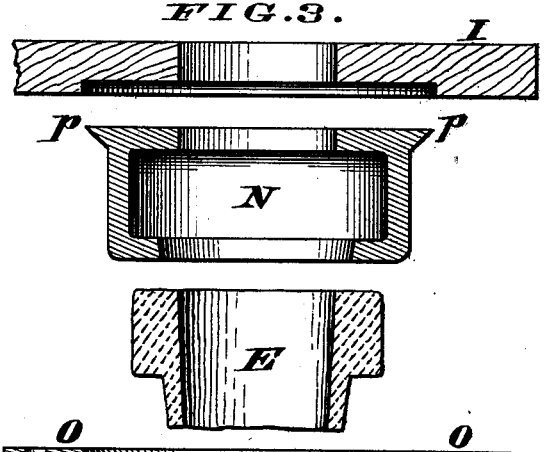
Figure 4:
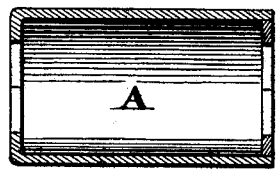
Figure 5:
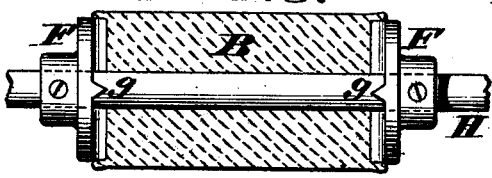
Figure 6:
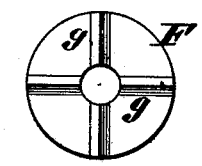

Figure 1 is a rear view of my seeding and fertilizing machine. Fig. 2 is a sectional view of one of the lower hoppers or conducting funnels and spouts through which the grain and fertilizing substance are conducted to the ground. Fig. 3 represents sections of the flanged ring that holds the conducting-spout. Fig. 4 shows a section of the hollow-shell roller; Fig. 5, the rubber-roller, and disks by which it is firmly held in place. Fig. 6 is a face view of the disk.

In Fig. 2, A represents the hollow-shell roller, of wrought material; B, the rubber roller, and D the lower hopper or conducting-funnel.

The rollers A and B are so arranged that their faces come in contact with one another, and as the grain drops from the hopper C, it is held between the rollers until it drops into the lower hopper, D, and is conducted through the spout E to the ground.

Heretofore the roller A has been made of solid metal or of hollow cast metal, was difficult to turn perfectly true, and was expensive and heavy. My hollow-shell roller, made of wrought metal, either by spinning the sides of a piece of sheet metal over and soldering the other end in, as shown, or in any other suitable manner, is much more easily made, perfectly true, and is much lighter and cheaper.

The fertilizing substance passes from the hopper C' through the tube E' to the spout E, and thence to the ground.

Fig. 4 also represents the hollow-shell roller A.

In Figs. 1 and 5, F represents the disks which are pressed against the ends of the rubber roller. The projections $g$, raised on the face of the disks F, fit into corresponding depressions in the ends of the rubber roller, and when the disks are pressed against the ends of the roller and fastened they hold them firmly in place and prevent them turning upon the shaft H.

I represents the spout-board, and $k\ k$ the standards by which the spout-board is suspended below the hopper G. This spout-board I holds the lower hoppers or conducting-funnels, D, and supports the conducting-spouts E, to which they are attached by the flanged connecting-ring N, as will hereinafter be described. This spout-board has heretofore been fastened to the hopper-stand at each end, without any support between, and had to be made heavy in order to sustain the weight in the center, and, being fastened at each end only, was more difficult to loosen, when necessary, or harder to get loose, and the hopper-stand had to be made extra heavy to sustain them. By the use of these standards, one or more at different points in the spout-board, the board and hopper may be made much cheaper and lighter, and are held more firmly in place, and are less liable to get out of order.

Fig. 3 represents the flanged connecting-ring which supports the conducting-spouts E. The upper edges of this ring are flanged outwardly and rest upon the metal ring O, and support the spouts E, which are fastened to them at their upper ends; and the ring N, and with it the spout E, may be turned round at pleasure, thus preventing the spout from wearing unevenly.

Heretofore square shafts have been most generally used for the elastic feed-rollers, to prevent their turning on the shaft. These square shafts were attended with a number of disadvantages, which are overcome by the use of round shafts in connection with ribbed plates and rolls having cavities molded therein.

Having fully described my invention, I claim—

1. The hollow wrought-metal feed-roll consisting of the wrought-iron tube having one end turned inward, and the other provided with the plate or disk therein, as shown.

2. The rubber feed-roll having recesses molded in its ends to receive the toothed disks, substantially as shown.

3. In a seeding-machine, a spout-board, I, sustained by means of pendent standards $k$, as and for the purposes described.

4. The combination of the seed-spout, having a flange formed on its upper end, a flanged ring, N, embracing the end of the spout, and the plate O, applied to hold the ring adjustably in place, as shown.

5. As a new article of manufacture, an improved rubber seed-spout for seeding-machines, having an annular suspending-flange formed thereon, as shown, whereby the necessity of the usual expanding devices is avoided, and the springing of the flanges into the retaining devices permitted.

6. The combination, in a seeding-machine, of pendent flanged spouts E, flanged rings N, the spout-board I, and standards $k$, substantially as shown.

7. The combination, in a seeding-machine, of the lower hopper, D, spout-board I, standards $k$, ring O, flanged ring N, and spout E, substantially as and for the purposes described.

8. The ring N, adapted to receive and hold the flanged tube E, as shown.

DAVIT F. HULL.

Witnesses:
A. B. ALMONEY,
ABRAHAM MILLER.